United States Patent [19]
Schmitt et al.

[11] 4,309,815
[45] Jan. 12, 1982

[54] METHOD OF MANUFACTURING A HOUSING FOR A SMALL ELECTRICAL MACHINE

[75] Inventors: Jakob Schmitt; Willy Voit, both of St. Ingbert, Fed. Rep. of Germany

[73] Assignee: Robert Bosch GmbH, Stuttgart, Fed. Rep. of Germany

[21] Appl. No.: 16,061

[22] Filed: Feb. 28, 1979

[30] Foreign Application Priority Data

Mar. 9, 1978 [DE] Fed. Rep. of Germany ....... 2810215

[51] Int. Cl.³ ............................................. H02K 15/14
[52] U.S. Cl. ............................... 29/596; 310/40 MM; 310/42; 310/89
[58] Field of Search ....................... 29/596; 310/89, 42, 310/40 MM, 154

[56] References Cited
U.S. PATENT DOCUMENTS

| | | | |
|---|---|---|---|
| 1,812,748 | 6/1931 | Kayser | 29/596 |
| 1,833,747 | 11/1931 | Haughton | 29/596 X |
| 3,131,462 | 5/1964 | Owings et al. | 29/596 |
| 3,818,585 | 6/1974 | Preece | 29/596 |
| 3,878,802 | 4/1975 | Schmitt et al. | 29/521 X |
| 4,074,159 | 2/1978 | Robison | 310/89 X |

*Primary Examiner*—Carl E. Hall
*Attorney, Agent, or Firm*—Michael J. Striker

[57] ABSTRACT

A housing for a small electrical machine, particularly a small electric motor, forms a part of the magnetic circuit of the same and is composed of a cylindrical wall of a magnetoconductive material and a sheet-metal strip which is also constituted by a magnetoconductive material and is bent about the cylindrical wall. A method of manufacturing of the housing includes the steps of bending a sheet-metal band so as to form the cylindrical wall, and bending the sheet-metal strip about the thus-bent sheet-metal band so that the latter serves as a mandrel. The sheet-metal band may be bent on a primary mandrel and temporarily retained on the latter so that the sheet-metal strip is then bent about the band when the latter is still retained on the primary mandrel. End portions of the sheet-metal band and the sheet-metal strip may be connected with one another along the same generatrix of the cylindrical wall.

12 Claims, 3 Drawing Figures

METHOD OF MANUFACTURING A HOUSING FOR A SMALL ELECTRICAL MACHINE

BACKGROUND OF THE INVENTION

The present invention relates to a housing for a small electrical machine, particularly a small electric motor with permanent magnets, and a method of manufacturing the same.

Housings for small electrical motors, having a cylindrical wall, are known. The cylindrical wall of a known housing is constituted by a sheet-metal band which is bent and has a thickness not exceeding 3 mm. A Sendzimir-zink-plated iron sheet is utilized for manufacturing such the band. The thus-produced cylindrical wall has the advantage that it possesses high corrosion-resistance characteristics. The cut off edges of the band are reliably protected against corrosion by the cathodic protective action. However, in the electric motors having great power, the cylindrical wall which forms a part of the magnetic circuit of the motor must have a thickness which exceeds the above-mentioned maximum thickness of the iron sheet. When it is necessary to provide the cylindrical wall forming a part of the magnetic circuit, with a thickness exceeding 4 mm, then the cylindrical wall must be manufactured from a plain not zink-coated sheet iron which is subsequently galvanically coated with zinc. Such a process is expensive and complicated. Moreover, in order to manufacture such thick iron sheet large and powerful processing machines are required.

SUMMARY OF THE INVENTION

Accordingly, it is an object of the present invention to provide a housing for a small electric machine and a method of manufacturing the same, which avoid the disadvantages of the prior art.

More particularly, it is an object of the present invention to provide a housing for a small electrical machine and a method of manufacturing the same, wherein the housing may have a thicker wall which, at the same time, can be produced in a simpler manner as compared with the known housings.

In keeping with these objects and with others which will become apparent hereinafter one feature of the present invention resides, briefly stated, in a method of manufacturing a housing of a small electrical machine, which includes the steps of providing a cylindrical wall constituted by a magnetoconductive material, and bending a sheet-metal strip about as well as securing the same on the cylindrical wall. The housing manufactured by the above-mentioned method may have a thickness exceeding the thickness of the known housings, and at the same time is produced in a simple manner.

In accordance with another advantageous feature of the present invention, the cylindrical wall is manufactured by bending of a sheet-metal band in the first step, and then bending the sheet-metal strip about the thus-bent band serving as a mandrel. The sheet-metal band may be bent on a primary mandrel and retained on the latter, whereas the sheet-metal strip is bent about the band when the latter is still retained on the primary mandrel.

Still another especially advantageous feature of the present invention is that end portions of the sheet-metal band and the sheet-metal strip may be connected with one another lengthwise of a generatrix of the cylindrical wall of the housing. This connection may be performed by interengaging formations provided on the end portions.

A further feature of the present invention is that the sheet-metal strip may have a width which is smaller than the width of the sheet-metal band forming the cylindrical wall of the housing. More particularly, the sheet-metal strip may have a width which corresponds to the width of the permanent magnets of the electrical machine, accommodated in the housing. In such a construction, the part of the housing which is formed by both the sheet-metal band and the sheet-metal strip is thicker which is necessary in order to satisfy the requirement made to the conduction of the magnetic flux. The remainder part of the housing which is formed only by the sheet-metal band projecting laterally outwardly beyond the ends of the sheet-metal strip, is thinner and has a thickness which is sufficient only to satisfy the requirements made to the rigidity of the housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENT

Figure 1:
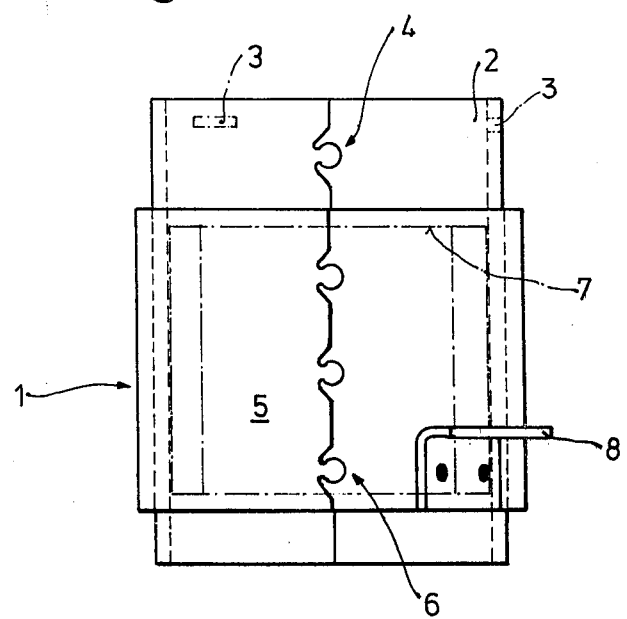
FIG. 1 is a side view of a housing manufactured in accordance with the present invention.
Figure 2:
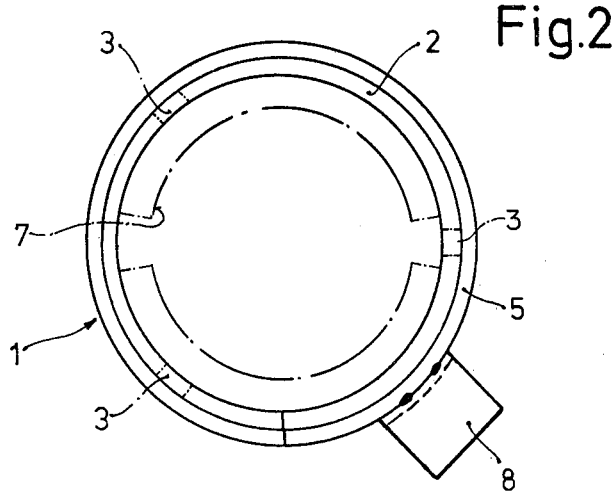
FIG. 2 is a plane view of the housing shown in FIG. 1.
Figure 3:
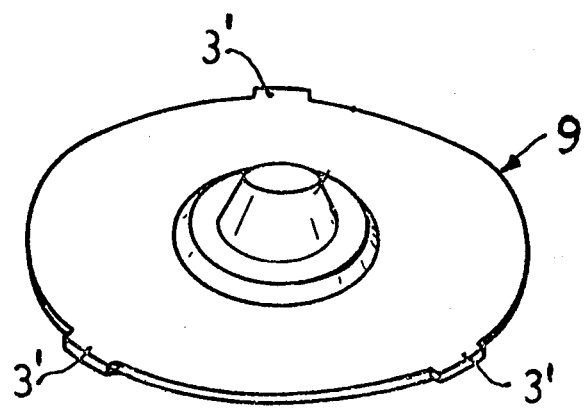
FIG. 3 is a view showing a disc utilized for manufacturing the housing.

A housing for a small electrical machine, particularly a small electric motor with permanent magnets, is identified in toto by reference numeral 1. The housing is annular and has two open ends. It is closed by not shown covers in a known manner. The covers may be formed as bearing plates for supporting a shaft of a rotor of the electric motor.

The housing 1 has a cylindrical wall 2 provided with recesses 3 which are shown in dotted lines. Holding means, such as projections formed on the above-mentioned covers, engage in the recesses 3 so as to connect the covers to the cylindrical wall 2 of the housing 1. The cylindrical wall 2 of the housing 1 is constituted by a sheet-metal band which is bent so as to assume a cylindrical shape. A Sendzimir-zink-plated iron sheet may be utilized as the sheet-metal band. End portions of the sheet-metal band which after bending is located adjacent to one another, is connected with one another by dovetailed connecting formations 4. The connecting formations extend lengthwise of the generatrix of the cylindrical wall 2.

A sheet-metal strip 5 is bent directly about the cylindrical wall 2 and secured in this position. End portions of the sheet-metal strip which are located adjacent to one another after bending, are connected with one another by dovetailed connecting formations 6, the latter also extending lengthwise of the generatrix of the cylindrical wall 2. The connecting formations 4 and 6 are superposed one upon the other or, in other words, are located lengthwise of the same generatrix of the cylindrical wall 2. The sheet-metal strip 5 is also constituted by a Sendzimir-zink-plated iron sheet. Both the sheet-metal band 2 and the sheet-metal strip 5 are constituted by materials having high magnetoconductive characteristics.

Permanent magnets 7 of the small electric motor are located inside of the thus-formed housing 1, as shown in dotted lines in the drawing. The sheet-metal strip 5 has a width which corresponds to the length of the permanent magnets of the electric motor. As a rule, this width is smaller than the total width of the housing 1. Thus, in the region of the permanent magnets the housing 1 is thicker, whereas in the regions located laterally beyond the permanent magnets the housing is thinner.

In order to avoid magnetic losses, the sheet-metal strip 5 is rigidly bent about the sheet-metal band so that the former is fitted on the latter without play. By the thus obtained force-locking connection, the sheet-metal strip 5 is set on the cylindrical wall 2 of the housing fixedly and immovably. They form a part of the magnetic circuit of the electric motor.

For flowing the magnetic flux through the thus-formed part of the magnetic circuit the latter must have a thickness equal to approximately 4 mm. Thereby, the sheet-metal band which is bent so as to form the cylindrical wall 2, and the sheet-metal strip 5 which is bent about the cylindrical wall 2, each must have a thickness equal to 2 mm. Both parts are constituted by a Sendzimir-zink-plated sheet whereby good corrosion protection is attained. The sheet-metal band forming the cylindrical wall 2, and the sheet-metal strip 5 are cut out from a Sendzimir-zink-plated sheet plate. The cut off edges do not have to be subjected to additional corrosion-protective treatment. The reason for this is that because of the above-mentioned thickness of the band and strip, the cut off edges are protected against corrosion as a result of cathodic action. Moreover, during the cutting process a part of the cut off edges become coated by a zink layer.

Several angle members 8 are mounted on the outer side of the bent sheet-metal strip 5, for example, by spot welding. One of such angle members 8 is shown in the drawing.

The above described housing is manufactured in the following manner:

A sheet-metal band which is constituted by a Sendzimir-zink-plated iron sheet, is bent about a roller mandrel in a first working step. The end portions of the sheet-metal band which are located adjacent to one another after bending, are connected with one another by the interengaging formations 14 in the same working step. Then, in a second step the sheet-metal strip 5 is bent about the sheet-metal band 2 when the latter is still retained on the mandrel, and is set in this position. The end portions of the sheet-metal strip 5 which are located adjacent to one another after bending and extend lengthwise of the generatrix of the cylindrical wall 2, are also connected with one another by interengaging connecting formations 6. As can be seen from the drawing, the interengaging formations 4 of the sheet-metal band 2 and the interengaging formations 6 of the sheet-metal strip 5 are superposed one upon the other or, in other words, are located at the same generatrix of the cylindrical wall 2. This position is attained when both parts are bent in the same bending machine. In this case, the sheet-metal strip 5 lies directly on the cylindrical wall 2, and both parts are force-lockingly connected with one another. Formation of an air gap between the parts 2 and 5 as a result of non-uniform circularity in various circumferential regions thereof, is thereby reliably eliminated. The absence of the air gap also results in an optimum magnetic flux. The sheet-metal band 2 may be bent about a body 9 provided with holding elements 3'. During such bending the holding elements 3' gradually penetrate into the recesses 3 of the sheet-metal band 2, as disclosed in U.S. Pat. No. 3,878,802.

A customary Sendzimir-zink-plated band with usual thickness tolerances can be utilized without exceeding the tolerances which are permissible for manufacture of housings for small electrical machines. Moreover, the corrosion protection of the cut off edges is fully guaranteed whereby a subsequent zink-plating or similar additional treatment is not needed. The sheet-metal strip which forms a part of the magnetic circuit may be fitted on the cylindrical wall 2 of the housing only at a location where the permanent magnets are arranged in the interior of the housing. Since the width of the sheet-metal strip 5 is determined only by the requirement made to the flowing of the magnetic flux, therefore the strip 5 can be shorter than the cylindrical wall 2. This results in a considerable material economy as compared with housings which have a uniform thickness over the entire length, determined by the flowing of the magnetic flux.

Naturally, in some cases the cylindrical wall may be constituted by materials other than the Sendzimir-zink-plated sheet iron. In such housings, the functions of the magnetic circuit are performed only by the sheet-metal strip 5 which is bent about the cylindrical wall. In other cases, the cylindrical wall 2 may be manufactured from a portion of a pipe, and then be wound by the sheet-metal strip 5.

It will be understood that each of the elements described above, or two or more together, may also find a useful application in other types of constructions differing from the types described above.

While the invention has been illustrated and described as embodied in a housing for a small electrical machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art, fairly constitute essential characteristics of the generic or specific aspects of this invention.

What is claimed as new and desired to be protected by Letters Patent is set forth in the appended claims:

1. A method for manufacturing a housing for a small electrical machine, particularly a small electric motor with permanent magnets, the housing forming a part of the magnetic circuit of the electrical machine, the method comprising the steps of providing a cylindrical wall constituted by a magneto-conductive material; and placing a sheet-metal strip constituted by a magneto-conductive material onto said cylindrical wall and securing the sheet-metal strip in position on said cylindrical wall, said placing and securing being performed by bending of said sheet-metal strip about said cylindrical wall so that the latter serves as a mandrel.

2. A method as defined in claim 1, wherein said providing step includes forming the cylindrical wall by bending a sheet-metal band, said step of bending the sheet-metal strip being performed by bending the latter about the thus-bent sheet-metal band.

3. A method as defined in claim 2, wherein the cylindrical wall has a generatrix, and the sheet-metal band forming the cylindrical wall has two end portions; and further comprising the step of connecting the end portions of the sheet-metal band with one another lengthwise of the generatrix.

4. A method as defined in claim 2, wherein said cylindrical wall has a generatrix, and the sheet-metal strip has two end sections; and further comprising the step of connecting said end sections of the sheet-metal strip with one another lengthwise of the generatrix of the cylindrical wall.

5. A method as defined in claim 3, wherein the sheet-metal strip has two end sections; and further comprising the step of connecting the end sections of the sheet-metal strip lengthwise of the same generatrix of the cylindrical wall.

6. A method as defined in claim 3, wherein said step of connecting the end portions of the sheet-metal band includes providing engaging formations on the end portions and interengaging the formations with each other.

7. A method as defined in claim 4, wherein said step of connecting the end sections of the sheet-metal strip with one another includes providing engaging formations on the end sections and interengaging the formations with each other.

8. A method as defined in claim 2, wherein the step of forming the cylindrical wall includes bending the sheet-metal band about a primary mandrel and retaining the thus-bent sheet metal band on the latter, said step of bending the sheet-metal strip including bending the same about the thus-bent sheet-metal band when the latter is retained on the primary mandrel.

9. A method as defined in claim 6, wherein the step of bending the sheet-metal band includes bending the same about a body provided with holding means on an edge section of the latter, and gradually engaging the holding means of the body with the formations of the sheet-metal band during bending of the sheet-metal band.

10. A method as defined in claim 1, wherein said bending step includes forming the sheet-metal strip of a Sendzimir-zinc-plated iron sheet.

11. A method as defined in claim 1, wherein said providing step includes forming the cylindrical wall of a Sendzimir-zinc-plated iron sheet.

12. A method as defined in claim 1, wherein said providing step includes forming the cylindrical wall so that it has an axis and is of a predetermined width, said bending step including forming the sheet-metal strip of a width which is smaller than the width of the cylindrical wall, so that after bending of the sheet-metal strip about the cylindrical wall, only a portion of width of the cylindrical wall is surrounded by the sheet-metal strip.

* * * * *